US010020683B2

(12) United States Patent
Carobolante et al.

(10) Patent No.: US 10,020,683 B2
(45) Date of Patent: Jul. 10, 2018

(54) SYSTEMS, APPARATUS, AND METHOD FOR A DUAL MODE WIRELESS POWER RECEIVER

(71) Applicant: QUALCOMM Incorporated, San Diego, CA (US)

(72) Inventors: Francesco Carobolante, Carlsbad, CA (US); Sreenivas Kasturi, Tigard, OR (US); Seong Heon Jeong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 661 days.

(21) Appl. No.: 14/521,045

(22) Filed: Oct. 22, 2014

(65) Prior Publication Data

US 2015/0115727 A1    Apr. 30, 2015

Related U.S. Application Data

(60) Provisional application No. 61/906,695, filed on Nov. 20, 2013, provisional application No. 61/897,962, filed on Oct. 31, 2013.

(51) Int. Cl.
*H02J 5/00*       (2016.01)
*H02J 7/02*       (2016.01)
(Continued)

(52) U.S. Cl.
CPC .............. *H02J 50/12* (2016.02); *H01F 38/14* (2013.01); *H02J 5/005* (2013.01); *H02J 7/025* (2013.01);
(Continued)

(58) Field of Classification Search
CPC .................................. H02J 5/005; H02J 7/025
(Continued)

(56) References Cited

U.S. PATENT DOCUMENTS

| 2011/0291489 A1* | 12/2011 | Tsai | H02J 17/00 307/104 |
| 2012/0235508 A1* | 9/2012 | Ichikawa | H02J 50/40 307/104 |

(Continued)

FOREIGN PATENT DOCUMENTS

| CN | 202435145 U | 9/2012 |
| CN | 103366931 A | 10/2013 |

(Continued)

OTHER PUBLICATIONS

International Search Report and Written Opinion—PCT/US2014/062003—ISA/EPO—dated Jan. 21, 2015.

*Primary Examiner* — Jared Fureman
*Assistant Examiner* — Win Htun
(74) *Attorney, Agent, or Firm* — Knobbe, Martens, Olson & Bear, LLP

(57) ABSTRACT

Systems, methods and apparatus are disclosed for a dual mode wireless power receiver. In accordance with on aspect, an apparatus for receiving wireless power is provided. The apparatus includes a first coil configured to wirelessly receive power from a first transmitter configured to generate a first alternating magnetic field having a first frequency. The apparatus further includes a second coil configured to wirelessly receive power from a second transmitter configured to generate a second alternating magnetic field having a second frequency higher than the first frequency. The second coil is positioned to enclose the first coil. A first coupling factor between the first coil and a coil of the first transmitter is higher than a second coupling factor between the second coil and a coil of the second transmitter when the first and second coils are positioned within respective charging regions of the first and second transmitters.

30 Claims, 9 Drawing Sheets

(51) Int. Cl.
*H01F 38/14* (2006.01)
*H02J 50/12* (2016.01)
*H02J 50/40* (2016.01)
*H02J 50/70* (2016.01)
*H02J 50/90* (2016.01)
*H02J 17/00* (2006.01)
*H04B 5/00* (2006.01)

(52) U.S. Cl.
CPC ............. *H02J 17/00* (2013.01); *H02J 50/40* (2016.02); *H02J 50/70* (2016.02); *H02J 50/90* (2016.02); *H04B 5/0037* (2013.01); *H04B 5/0075* (2013.01); *H04B 5/0087* (2013.01)

(58) Field of Classification Search
USPC ........................................................ 307/104
See application file for complete search history.

(56) References Cited

U.S. PATENT DOCUMENTS

| | | | |
|---|---|---|---|
| 2013/0057079 A1 | 3/2013 | Park et al. | |
| 2014/0210406 A1 | 7/2014 | Na et al. | |
| 2015/0054455 A1* | 2/2015 | Kim ........................ | H02J 17/00 320/108 |

FOREIGN PATENT DOCUMENTS

| | | |
|---|---|---|
| EP | 2804290 A1 | 11/2014 |
| KR | 20130024757 A | 3/2013 |
| KR | 20130081629 A | 7/2013 |

* cited by examiner

SYSTEMS, APPARATUS, AND METHOD FOR A DUAL MODE WIRELESS POWER RECEIVER

CLAIM OF PRIORITY UNDER 35 U.S.C. § 119

This application claims priority to: 1) Provisional Application No. 61/897,962 entitled "SYSTEMS, APPARATUS, AND METHODS FOR A DUAL MODE WIRELESS POWER RECEIVER" filed Oct. 31, 2013, and 2) Provisional Application No. 61/906,695 entitled "SYSTEMS, APPARATUS, AND METHODS FOR A DUAL MODE WIRELESS POWER RECEIVER" filed Nov. 20, 2013. The disclosure of each is hereby expressly incorporated in its entirety by reference herein.

FIELD

The present disclosure relates generally to wireless power receiver coil configurations. More specifically, the present disclosure relates to systems, apparatus, and methods for a dual mode wireless power receiver.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an apparatus for receiving wireless power. The apparatus includes a first coil configured to wirelessly receive power from a first transmitter configured to generate a first alternating magnetic field having a first frequency. The apparatus further includes a second coil configured to wirelessly receive power from a second transmitter configured to generate a second alternating magnetic field having a second frequency higher than the first frequency. The second coil is positioned to enclose the first coil. A first coupling factor between the first coil and a coil of the first transmitter is higher than a second coupling factor between the second coil and a coil of the second transmitter when the first and second coils are positioned within respective charging regions of the first and second transmitters.

Another aspect of the subject matter described in the disclosure provides an implementation of a method of receiving wireless power. The method includes wirelessly receiving power via a first coil from a first transmitter configured to generate a first alternating magnetic field having a first frequency. The method includes wirelessly receiving power via a second coil from a second transmitter configured to generate a second alternating magnetic field having a second frequency higher than the first frequency. The second coil is positioned to enclose the first coil. A first coupling factor between the first coil and a coil of the first transmitter is higher than a second coupling factor between the second coil and a coil of the second transmitter when the first and second coils are positioned within respective charging regions of the first and second transmitters.

Yet another aspect of the subject matter described in the disclosure provides a non-transitory computer-readable medium comprising code. The code, when executed, causes an apparatus to wirelessly receive power via a first coil from a first transmitter configured to generate a first alternating magnetic field having a first frequency. The code, when executed, further causes the apparatus to wirelessly receive power via a second coil from a second transmitter configured to generate a second alternating magnetic field having a second frequency higher than the first frequency. The second coil is positioned to enclose the first coil. A first coupling factor between the first coil and a coil of the first transmitter is higher than a second coupling factor between the second coil and a coil of the second transmitter when the first and second coils are positioned within respective charging regions of the first and second transmitters.

Yet another aspect of the subject matter described in the disclosure provides an apparatus for receiving wireless power. The apparatus includes first means for wirelessly receiving power from a first transmitter configured to generate a first alternating magnetic field having a first frequency. The apparatus further includes second means for wirelessly receiving power from a second transmitter configured to generate a second alternating magnetic field having a second frequency higher than the first frequency. The second means for wirelessly receiving power is positioned to enclose the first means for wirelessly receiving power. A first coupling factor between the first means and the first transmitter being higher than a second coupling factor between the second means and the second transmitter when the first and second means for wirelessly receiving power are positioned within respective charging regions of the first and second transmitters.

Figure 1:
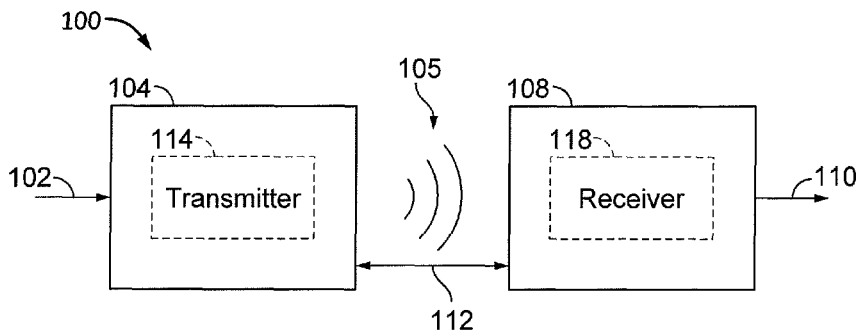
FIG. 1 is a functional block diagram of an exemplary wireless power transfer system, in accordance with exemplary implementations of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary implementations of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary implementation, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
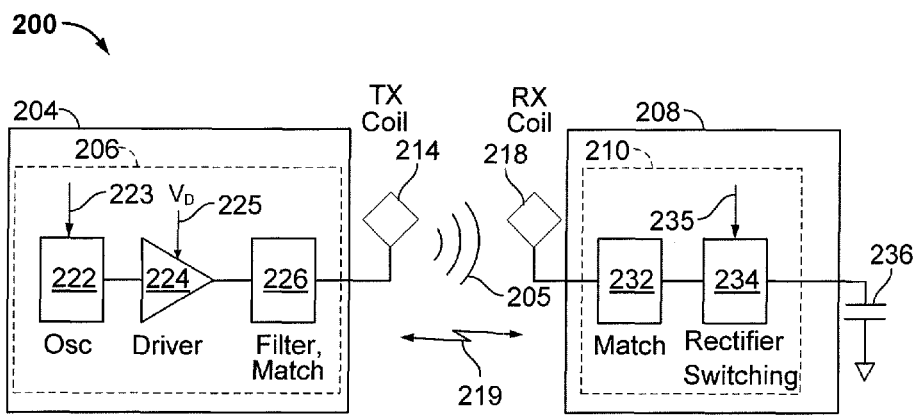
FIG. 2 is a functional block diagram of exemplary components that may be used in the wireless power transfer system of FIG. 1, in accordance with various exemplary implementations of the invention.

FIG. 2 is a functional block diagram of exemplary components that may be used in the wireless power transfer system 100 of FIG. 1, in accordance with various exemplary implementations of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or power an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some implementations, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
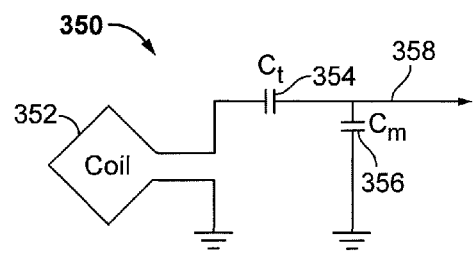
FIG. 3 is a schematic diagram of a portion of transmit circuitry or receive circuitry of FIG. 2 including a transmit or receive antenna, in accordance with exemplary implementations of the invention.

FIG. 3 is a schematic diagram of a portion of transmit circuitry 206 or receive circuitry 210 of FIG. 2 including a transmit or receive antenna 352, in accordance with exemplary implementations of the invention. As illustrated in FIG. 3, transmit or receive circuitry 350 used in exemplary implementations including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmit antenna 214 coil to the receive antenna 218 residing in the neighborhood where this field 105 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the antenna 352 may be an input to the antenna 352.

In one implementation, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
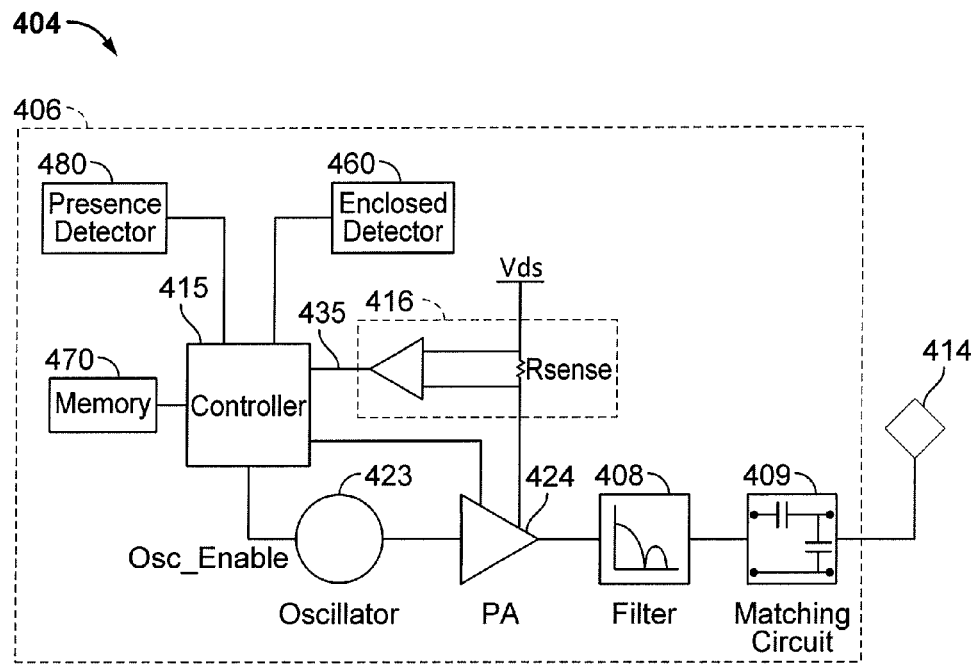
FIG. 4 is a functional block diagram of a transmitter that may be used in the wireless power transfer system of FIG. 1, in accordance with exemplary implementations of the invention.

FIG. 4 is a functional block diagram of a transmitter 404 that may be used in the wireless power transfer system of FIG. 1, in accordance with exemplary implementations of the invention. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary implementations may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary implementations, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary implementations, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
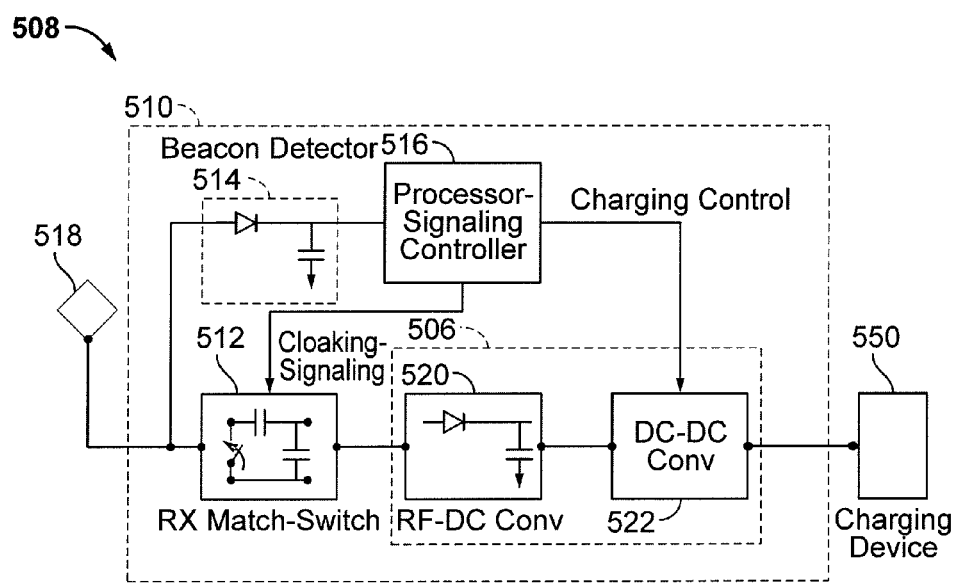
FIG. 5 is a functional block diagram of a receiver that may be used in the wireless power transfer system of FIG. 1, in accordance with exemplary implementations of the invention.

FIG. 5 is a functional block diagram of a receiver 508 that may be used in the wireless power transfer system of FIG. 1, in accordance with exemplary implementations of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (and other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller that the diameter of length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary implementation, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
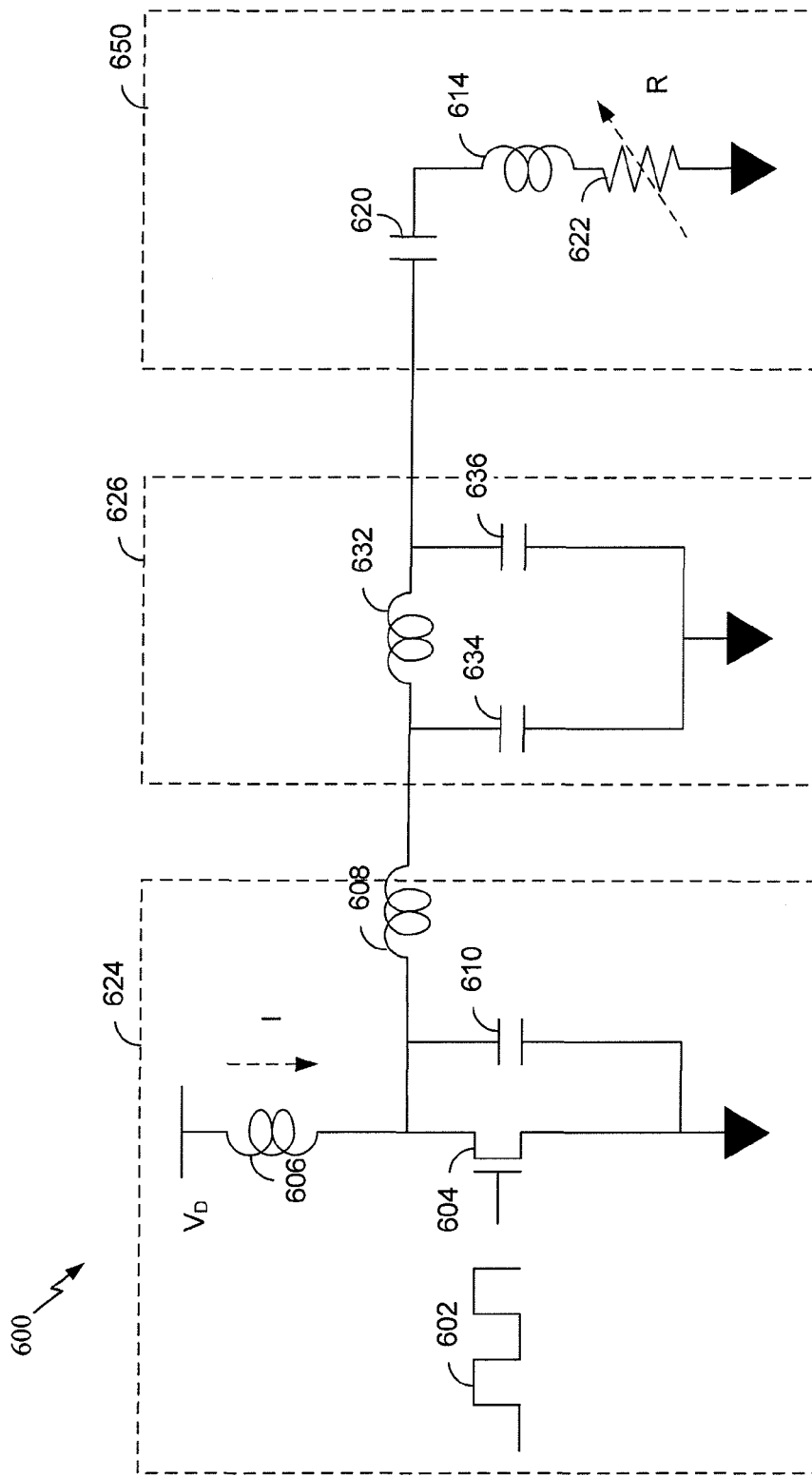
FIG. 6 is a schematic diagram of a portion of transmit circuitry that may be used in the transmit circuitry of FIG. 4, in accordance with exemplary implementations.

FIG. 6 is a schematic diagram of a portion of transmit circuitry 600 that may be used in the transmit circuitry 406 of FIG. 4. The transmit circuitry 600 may include a driver circuit 624 as described above in FIG. 4. The driver circuit 624 may be similar to the driver circuit 424 shown in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with implementations of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

As described above, a loosely coupled wireless power system includes a transmitter 404 and receiver 508. The transmitter 404 creates a magnetic field which couples to the receiver 508 and converts magnetic energy into electrical energy. The receiver 508 is connected to a device to be charged which draws on the electrical energy. As indicated above, the device being charged could be any electronic hardware such as a cellular phone, a computer, a Bluetooth headset, or the like. The transmitter 404 may communicate with any given receiver 508 via a communications links (e.g., Bluetooth, zigbee, WIFI, or the like). The communication link allows the receiver 508 to send feedback data to the transmitter 404 such that the transmitter 404 may vary the strength of its magnetic field to adjust the electrical energy being transferred. A receiver 508 may be considered "compliant" if it is able to communicate with the transmitter 404 and function according to system control parameters of the transmitter 404.

It is advantageous to have a receiver 508 that can receive power from transmitters having different configurations and operating characteristics with different wireless power features. Certain aspects of certain implementations described herein are related to dual mode receivers that may be able to receive power from different transmitter types. For example a first type transmitter 404 may be configured to transmit according to a tightly coupled relationship where the coil 414 of the transmitter 404 and the coil 518 of the receiver are closely aligned. In this case a coupling factor between the coils may be greater than or equal to 0.5. A second type transmitter 404 may be configured according to a loosely coupled relationship where the coil 414 of the transmitter 404 and the coil 518 of the receiver may not have to be closely aligned and power may be transferred sufficiently for example, for coupling factors less than 0.5. It may be advantageous, therefore, for a receiver 508 to be able to wirelessly receive power from both transmitter types.

In one aspect of an implementation, a wireless power receiver 508 may include at least two different coils having different configurations where each coil is configured to wirelessly receive power from a different transmitter type. In some cases while efficiency of one coil may be affected by the other, the losses in efficiency as a result may be mitigated or low enough to allow both coils to operate sufficiently well.

Figure 7:
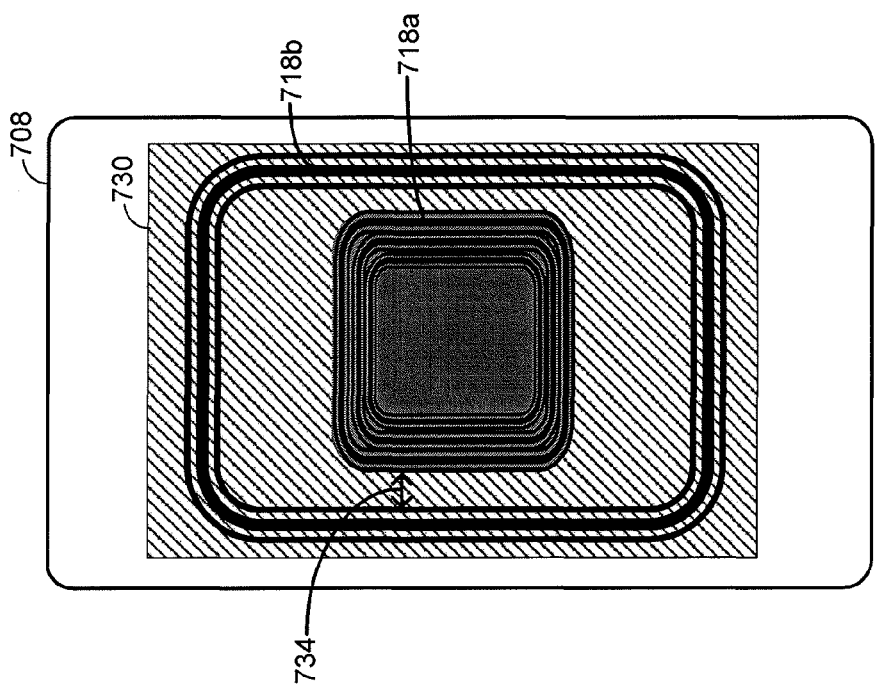
FIG. 7 is a diagram of a dual mode wireless power receiver including first and second coils configured to wirelessly receive power, in accordance with exemplary implementations.

FIG. 7 is a diagram of a dual mode wireless power receiver 708 including first and second coils 718a and 718b configured to wirelessly receive power, in accordance with exemplary implementations. Each of the first and second coils 718a and 718b may be configured to be compatible with a different transmitter type that operate according to different sets of operating characteristics, wireless power requirements and/or features. For example, the first coil 718a may be configured to wirelessly receive power from a first transmitter 404 configured to generate an alternating magnetic field having a first frequency. The first coil 718a may be configured to be positioned immediately proximate and/or closely aligned with a coil 414 of the transmitter 404. In this case, a receiver 708 and transmitter 404 may be configured such that the receive coil 718a and the transmit coil 414 are tightly coupled (e.g., a coupling factor between the receive coil 718a and the transmit coil 414 is greater than or equal to 0.5) when transferring power. The receive and transmit circuitry as well as system control and operating characteristics for power transfer may be configured to operate when the receive coil 718a and transmit coil 414 are closely aligned in this manner according to a tightly coupled relationship.

A second coil 718b may be configured to wirelessly receive power from a second transmitter 404 configured to generate an alternating magnetic field having a second frequency different than the first frequency. For example, the second frequency may be configured to be substantially 6.78 MHz while the first frequency may be lower (e.g., significantly lower on the order of substantially 100-500 kHz). The second coil 718b may be a part of a receive antenna circuit that is configured to resonate at the operating frequency (e.g., 6.78 MHz). The second coil 718b may be configured to be positioned anywhere within a charging region of the transmitter 404 where the second coil 718b and the transmit coil 414 may not be closely aligned such that a receiver 708 may have spatial freedom and be able to be moved to different positions with respect to the transmit coil while charging. A receiver 708 and transmitter 404 may be configured such that the receive coil 718b and the transmit coil 414 are loosely coupled (e.g., a coupling factor between the receive coil 718b and the transmit coil 414 is less than for example 0.5) when transferring power. The receive and transmit circuitry as well as system control and operating characteristics for power transfer may be configured to operate when the receive coil 718 and transmit coil 414 are loosely coupled and are not closely aligned. As such the first receive coil 718a and accompanying receive circuitry may be configured to be compliant with a first set of requirements and the second receive coil 718b and accompanying receive circuitry may be configured to be compliant with a second and different set of requirements.

In accordance with an implementation, the second receive coil 718b is configured to be built and positioned around the first receive coil 718a and may for example at least partially or fully enclose the first receive coil 718a. The second receiver coil 718b may be a loop type as shown or a spiral type. The overall dimensions of the second receiver coil 718b relative to the first receiver coil 718b may be bigger to allow for greater freedom of placement relative to the transmit coil 404 while receiving sufficient power. The loop type coil 718b encircling the first coil 718a may allow for meeting design requirements for the second coil 718b associated with power being transferred according to a second frequency and associated power and operating requirements while also allowing the first coil 718a to satisfy requirements for a lower first operating frequency and associated power and operating requirements. As will be further described below, receive circuitry and other control circuitry may be configured to detect which type of transmitter is transmitting power and provide isolation between the frequencies to ensure the first coil 718a is not impacted by the wireless field intended for the second coil 718b and vice-versa.

There may be a minimum distance 734 between the outermost turn of the first coil 718a and the innermost turn of the second coil 718b to reduce (e.g., attenuate) losses due to parasitic coupling between the two coils 718a and 718b.

The first and second receiver coils 718a and 718b may be positioned and affixed to the same substrate and may generally utilize the same region within the device. The receiver 708 may include a magnetic material 730 that may be positioned between other components of the receiver device and the receive coils 718a and 718b. This magnetic material 730 may be a ferrite sheet. The magnetic material 730 may be selected based on an operating frequency, e.g., use a high frequency ferrite material. The first and second receive coils 718a and 718b may be positioned on top of or over the same ferrite sheet.

In other implementations, a parasitic coil (not shown) may be disposed such that the parasitic coil does not overlap the first coil 718a but encloses, surrounds or is disposed around a perimeter of the first coil 718a. In such implementations, the second coil 718b may enclose, surround or be disposed around a perimeter of the parasitic coil and the first coil 718a. In operation, a current induced in the first coil 718a may generate a magnetic field in the parasitic coil that is 180° out of phase with a magnetic field of the first coil 718a. These opposite magnetic fields may substantially cancel one another out, reducing any mutual coupling and mutual inductance between the first coil 718a and the second coil 718b.

Figure 8:
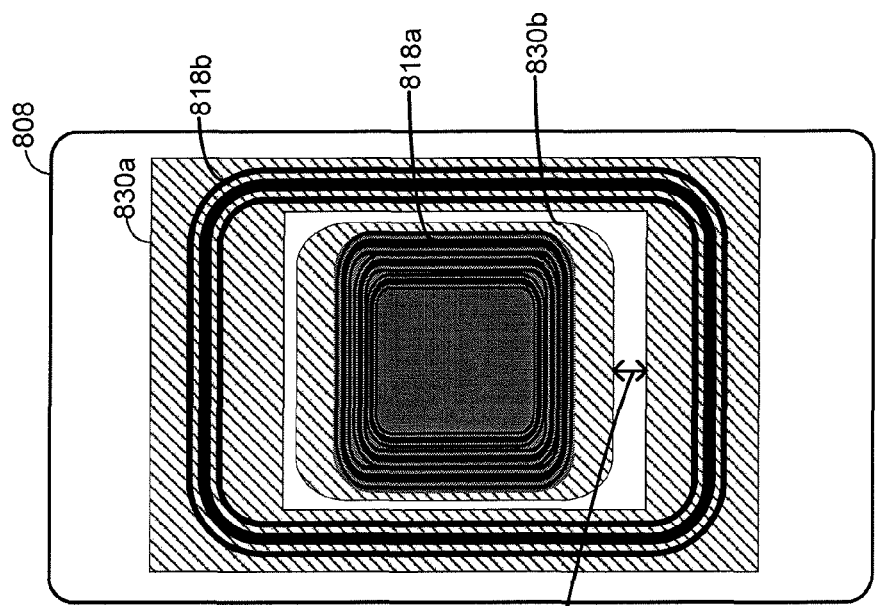
FIG. 8 is another diagram of a dual mode wireless power receiver including first and second coils configured to wirelessly receive power, in accordance with exemplary implementations.

In yet other implementations the magnetic material that lies under the first coil may be separated from the ferrite lying under the second coil by a gap, as shown in FIG. 8. This may allow reducing losses due to parasitic coupling between the two coils. FIG. 8 is another diagram of a dual mode wireless power receiver 808 including first and second coils 818a and 818b configured to wirelessly receive power, in accordance with exemplary implementations. FIG. 8 shows an implementation with a gap 834 between a first portion of magnetic material 830a and a second portion of magnetic material 830b under the two coils 818a and 818b, respectively. Physical discontinuity between the first portion of magnetic material 830a and the second portion of magnetic material 830b provided by the air gap 834 may decouple the H-field in the first portion of magnetic material 830a from the second portion of magnetic material 830b (e.g., the gap 834 attenuates an amount of magnetic flux flowing from the first portion 830a to the second portion 830b). This may improve isolation as compared to the implementation of FIG. 7 since less H-field flux is coupled from the first portion of magnetic material 830a to the second portion of magnetic material 830b. This reduces mutual inductance and increases isolation between the first and second coils 818a and 818b. In addition, any implementation where multiple portions or layers of magnetic material are utilized may have different magnetic permeability values for the multiple portions or layers of magnetic material.

Figure 9:
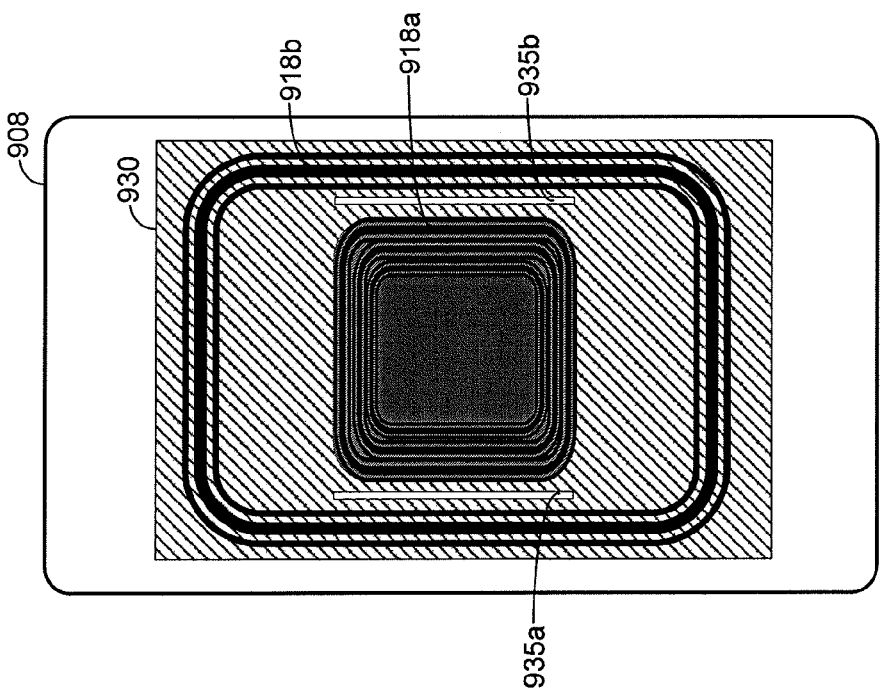
FIG. 9 is another diagram of a dual mode wireless power receiver including first and second coils configured to wirelessly receive power, in accordance with exemplary implementations.

In yet another implementation the magnetic material that lies under the first and second coils may include one or more air gaps only in critical locations in the magnetic material. FIG. 9 is another diagram of a dual mode wireless power receiver 908 including first and second coils 918a and 918b configured to wirelessly receive power, in accordance with exemplary implementations. FIG. 9 shows an implementation with a first gap 935a and a second gap 935b in a magnetic material 930. The air gaps 935a and 935b may be located between the first and second coils 918a and 918b. The air gaps 935a and 935b may be located on sides of the first coil 918a that are closest to the second coil 918b. Physical discontinuity in portions of the magnetic material 930 between the first and second coils 918a and 918b may serve to at least partially decouple the H-field in the magnetic material 930 under the first coil 918a from the H-field in the magnetic material 930 under the second coil 918b, or vice versa. This may improve isolation as compared to the implementation of FIG. 7 since less H-field flux is coupled between the portions of the magnetic material 930 under the first coil 918a and the portions of the magnetic material 930 under the second coil 918b. This reduces mutual inductance and increases isolation between the first and second coils 918a and 918b.

Figure 10:
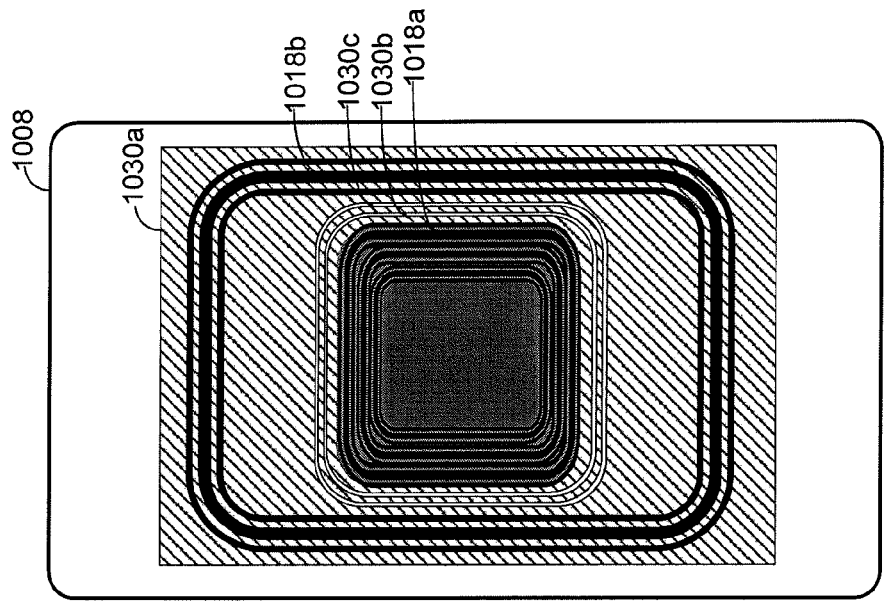
FIG. 10 is another diagram of a dual mode wireless power receiver including first and second coils configured to wirelessly receive power, in accordance with exemplary implementations.

FIG. 10 is another diagram of a dual mode wireless power receiver 1008 including first and second coils 1018a and 1018b configured to wirelessly receive power, in accordance with exemplary implementations. FIG. 10 shows an implementation with the first coil 1018a and the second coil 1018b, as previously described in connection with FIGS. 7-9. FIG. 10 further includes a magnetic material 1030a disposed under the first and second coils 1018a and 1018b. FIG. 10 further includes a first ring of magnetic material 1030b disposed in the plane of the magnetic material 1030a and surrounding, enclosing or extending around a perimeter of the first coil 1018a. FIG. 10 may further include a second ring of magnetic material 1030c disposed in the plane of the magnetic material 1030a and surrounding, enclosing or extending around a perimeter of the first coil 1018a and the first ring 1030b. The magnetic permeability of the first and second rings 1030b and 1030c may be different from one another and/or different from the magnetic permeability of the magnetic material 1030a. The first ring 1030b and the second ring 1030c may be physically and electrically isolated from one another. The electrical, physical and permeability discontinuity between each of the magnetic material 1030a, the first ring 1030b and the second ring 1030c may serve to at least partially decouple the H-field in a first portion of the magnetic material 1030a under the first coil 1018a from the H-field in a second portion of the magnetic material 1030a under the second coil 1018b. This may improve isolation as compared to the implementation of FIG. 7 since less H-field flux is coupled from the portions of the magnetic material 1030 under the first coil 1018a to portions of the magnetic material 1030 under the second coil 1018b, or vice versa. This reduces mutual inductance and increases isolation between the first and second coils 1018a and 1018b.

Table 1 shows example measurements of resistance and inductance of the first and second coils as well as mutual inductance between the first and second coils as previously described in connection with the implementations of FIGS. 7-10. For example, exemplary measurements are shown for an implementation where no magnetic layer (e.g., ferrite) is utilized, where the magnetic layer is disposed only under the first coil, where the magnetic layer is disposed as a single sheet under both the first and second coils (as described in connection with FIG. 7), where different magnetic layers are disposed under each of the first and second coils separated from one another by a gap (as described in connection with FIG. 8), and where a parasitic coil is utilized (as described in connection with FIG. 7). The example measurements were taken at a frequency of approximately 500 kHz for the first coil and at approximately 6.78 MHz for the second coil.

TABLE 1

| Description | Second Coil | | First Coil | | |
| --- | --- | --- | --- | --- | --- |
| | R (Ω) | L (µH) | R (Ω) | L (µH) | M (nH) |
| No ferrite | 0.6 | 1.3 | 5.4 | 8.6 | 425 |
| Ferrite under 1$^{st}$ coil | 0.6 | 1.3 | 6.6 | 15.4 | 442 |
| Ferrite under both coils | 0.9 | 2.2 | 6.6 | 16.9 | 703 |
| Gap between ferrite under both coils | 0.9 | 2.0 | 6.6 | 15.4 | 496 |
| Parasitic Coil | 1.1 | 2.1 | 9.5 | 15.6 | 391 |

In each of the implementations shown in FIGS. 7-10, the first and second coils do not overlap. In some implementations, as those shown in FIGS. 11-13, the first and second coils may overlap one another and at least some of the conductors of the first and second coils may be orthogonal to one another at points of intersection or overlap. Since a current passing through each of the first and second coils travels in the direction of the conductors making up the first and second coils, magnetic fields induced by respective currents passing through the overlapping or intersecting portions of the conductors of the first and second coils will also be orthogonal to one another. This orthogonality of conductors, currents and magnetic fields reduces or attenuates mutual inductance between the first and second coils.

Figure 11:
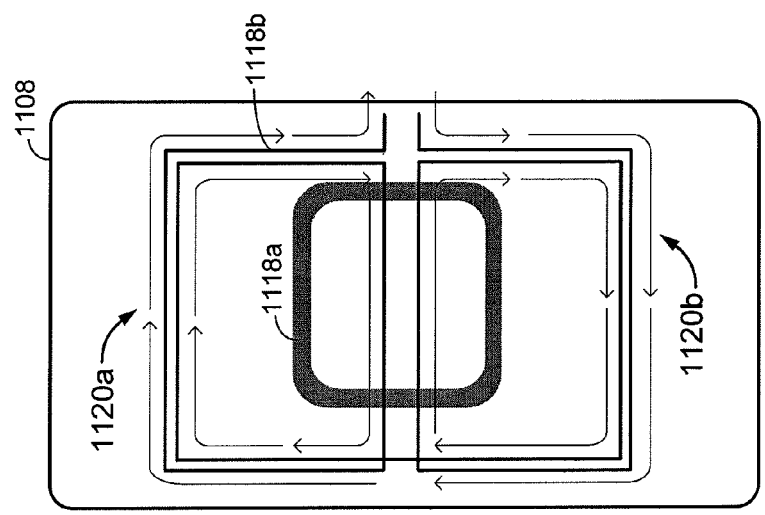
FIG. 11 is another diagram of a dual mode wireless power receiver including first and second coils configured to wirelessly receive power, in accordance with exemplary implementations.

FIG. 11 is another diagram of a dual mode wireless power receiver 1108 including first and second coils 1118a and 1118b configured to wirelessly receive power, in accordance with exemplary implementations. In the receiver 1108, the second coil 1118b may comprise a first looping portion 1120a and a second looping portion 1120b (e.g., two local turns). As shown, a conductor of the first looping portion 1120a may overlap the first coil 1118a and may extend in a direction orthogonal to a direction that a conductor of the first coil 1118a extends at the point of overlap. Similarly, a conductor of the second looping portion 1120b may overlap the first coil 1118a and may extend in a direction orthogonal to a direction that a conductor of the first coil 1118a extends at the point of overlap. A current induced in the second coil 1118b may travel in a direction as shown by the arrows. As shown in FIG. 11, the current may travel in the same direction through each turn of the first looping portion 1120a and in the same direction through each turn of the second looping portion 1120b. This may increase an inductance of the second coil 1118b. However, the current travels in the opposite direction through adjacent, substantially parallel conductors of the first and second looping portions. This may decrease a mutual inductance (and coupling) between the first and second coils 1118a and 1118b since the magnetic fields induced in the first coil 1118a by the current passing though the adjacent, substantially parallel conductors of the first and second looping portions will be substantially equal in magnitude but opposite in polarity, and thus, substantially cancel one another.

Figure 12:
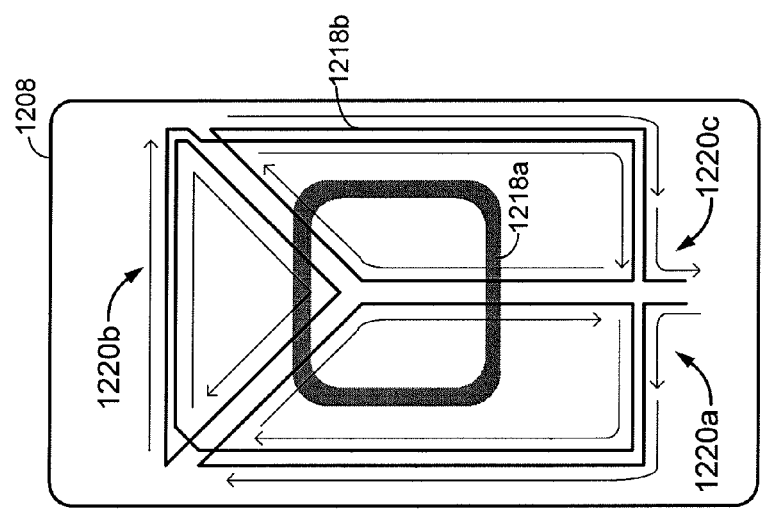
FIG. 12 is another diagram of a dual mode wireless power receiver including first and second coils configured to wirelessly receive power, in accordance with exemplary implementations.

FIG. 12 is another diagram of a dual mode wireless power receiver 1208 including first and second coils 1218a and 1218b configured to wirelessly receive power, in accordance with exemplary implementations. In the receiver 1208, the second coil 1218b may comprise a first looping portion 1220a, a second looping portion 1220b, and a third looping portion 1220c (e.g., three local turns). As shown, a conductor of the first looping portion 1220a may overlap the first coil 1218a and may extend in a direction orthogonal to a direction that a conductor of the first coil 1218a extends at the point of overlap. Similarly, a conductor of the third looping portion 1220c may overlap the first coil 1218a and may extend in a direction orthogonal to a direction that a conductor of the first coil 1218a extends at the point of overlap. A current induced in the second coil 1218b may travel in a direction as shown by the arrows. As shown in FIG. 12, the current may travel in the same direction through each turn of the first looping portion 1220a, in the same direction through each turn of the second looping portion 1220b, and in the same direction through each turn of the third looping portion 1220c. However, the current travels in the opposite direction through adjacent, substantially parallel conductors of each of the first, second and third looping portions 1220a, 1220b, 1220c. This arrangement may increase inductance of the second coil 1218b as well as decrease the mutual inductance between the first and second coils 1218a and 1218b, as previously described in connection with FIG. 11.

Figure 13:
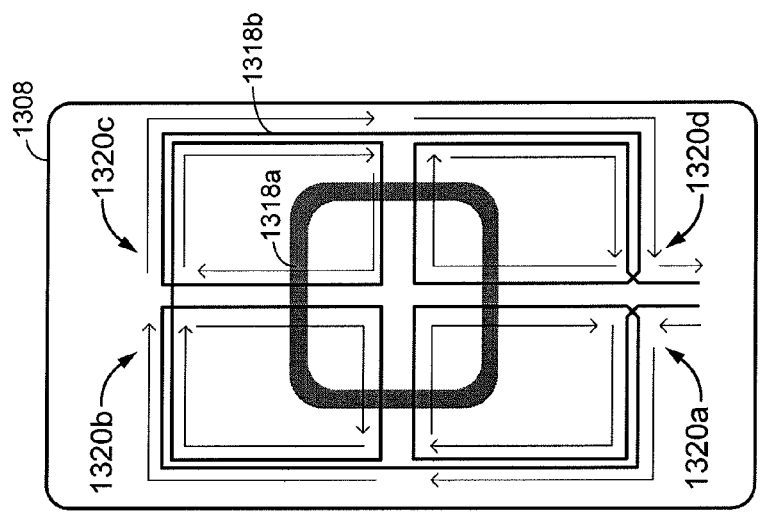
FIG. 13 is another diagram of a dual mode wireless power receiver including first and second coils configured to wirelessly receive power, in accordance with exemplary implementations.

FIG. 13 is another diagram of a dual mode wireless power receiver 1308 including first and second coils 1318a and 1318b configured to wirelessly receive power, in accordance with exemplary implementations. In the receiver 1308, the second coil 1318b may comprise a first looping portion 1320a, a second looping portion 1320b, a third looping portion 1320c, and a fourth looping portion 1320d (e.g., four local turns). As shown, a conductor of each of the first through fourth looping portions 1320a, 1320b, 1320c, 1030d may overlap the first coil 1318a and may extend in a direction orthogonal to a direction that a respective conductor of the first coil 1318a extends at the points of overlap. A current induced in the second coil 1318b may travel in a direction as shown by the arrows. As shown in FIG. 13, the current may travel in the same direction through each turn of the first through fourth looping portions 1320a-1320d, respectively. However, the current travels in the opposite direction through adjacent, substantially parallel conductors of each of the first through fourth looping portions 1320a-1320d. This arrangement may increase inductance of the second coil 1318b as well as decrease the mutual inductance between the first and second coils 1318a and 1318b, as previously described in connection with FIGS. 11 and 12. Although the second coil in each of FIGS. 11-13 show a total of two global turns (e.g., two substantially parallel conductors run along substantially the entire perimeter of the second coil in each of FIGS. 11-13), any number of global turns may be contemplated.

While FIGS. 7-13 show two coils, in some implementations, at least a portion of the first and second coils may be shared. For example, in an implementation, the first and second coils may share a terminal or other circuitry. In another implementation, a common conductive structure may be used for the first and second coils or for a portion of the coils. In this case, circuitry may be configured to electrically connect to the common conductive structure to allow different types of operation (e.g., operate at different operating frequencies). As such, the first and second coils may be combined in such a way that they are not completely separate, in accordance with the implementations described herein.

With reference to FIGS. 7-13, in some implementations the first and second coils may have different receive circuitry associated therewith (e.g., each coil has a separate receive chain). The different receive circuitry may be configured to convert power received according to different operating requirements based on the type and way power is configured to be received by the first and second coils such that each of the first and second coils may provide power necessary for powering a common load coupled to the first and second coils.

In FIGS. 11-13 no magnetic material is described. However, the present disclosure contemplates any combination of first and second coils as previously described in any of FIGS. 11-13 with any of the magnetic material arrangements as previously described in connection with any of FIGS. 7-10.

An experimental comparison of the resistance, inductance and mutual inductance for the design shown in FIG. 7 versus the design shown in FIG. 13 are shown in table 2 below. As can be seen in table 2, the design of FIG. 13, having four local looping portions 1320a-1320d each contributing to the global second loop 1318b, reduces the resistance of the second coil 1318b as compared to the second coil 718b, increases the inductance of the first coil 1318a as compared to the first coil 718a, and decreases the mutual inductance between the first and second coils 1318a and 1318b as compared to the first and second coils 718a and 718b. In addition, experimental comparison shows that a ratio of a maximum mutual inductance to a minimum mutual inductance between the first and second coils 1318a and 1318b of FIG. 13 is lower than the same ratio for the first and second coils 718a and 718b of FIG. 7. Specifically, a maximum mutual inductance between the first and second coils 1318a and 1318b may be lower than between the first and second coils 718a and 718b because the local loop configuration of FIG. 13 causes a more uniform H-field than in the configuration of FIG. 7.

TABLE 2

|  |  | R (Ω) | L (µH) | M (nH) |
|---|---|---|---|---|
| FIG. 7 | First Coil 718b | 26.9 | 13.34 | 811 |
|  | Second Coil 718a | 0.8 | 0.742 |  |
| FIG. 13 | First Coil 1318b | 22 | 13.49 | 684 |
|  | Second Coil 1318a | 0.8 | 0.773 |  |

Figure 14:
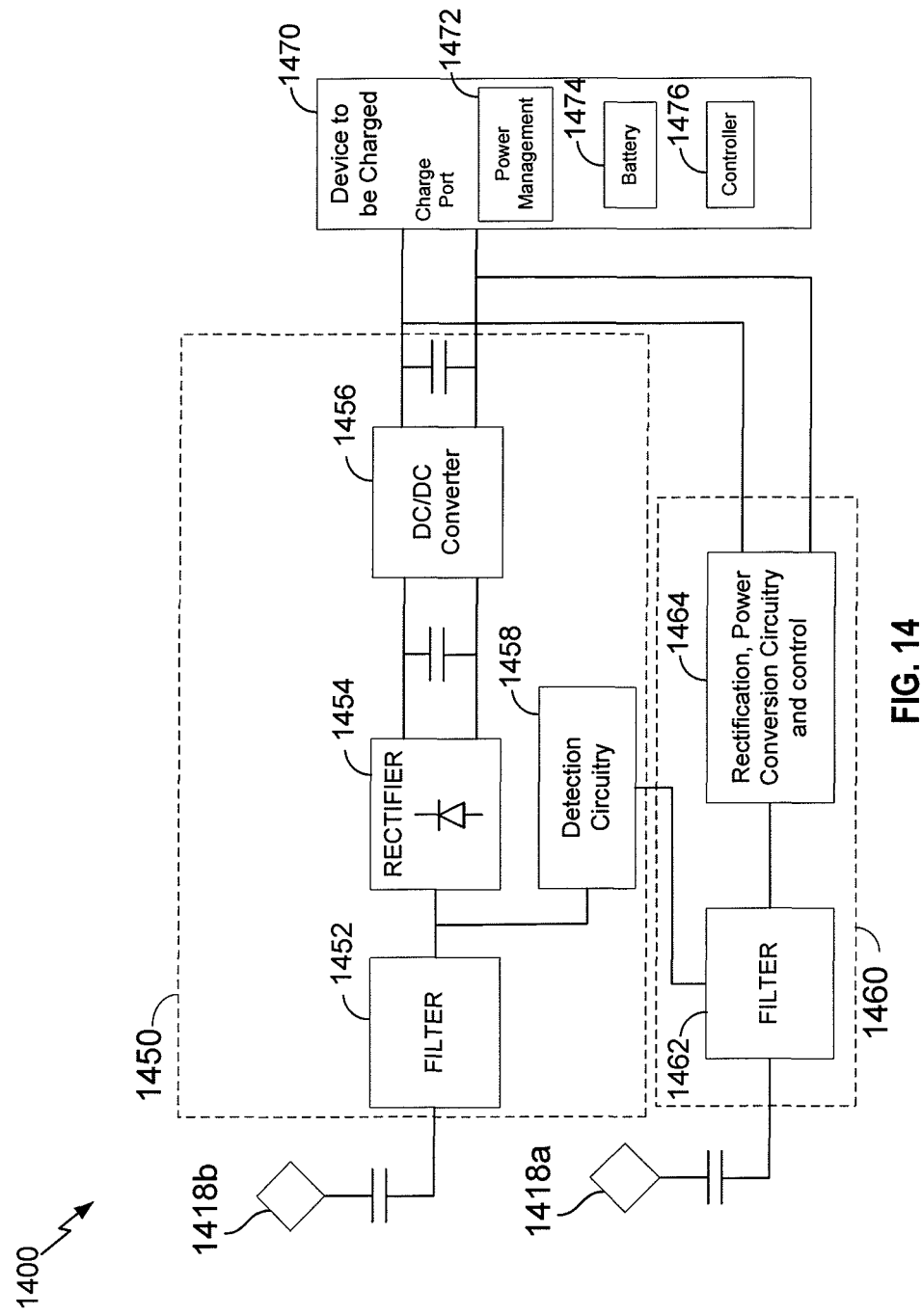
FIG. 14 is a functional block diagram of wireless power circuitry in accordance with a dual mode receiver configuration with a first and second coil, in accordance with exemplary implementations.

FIG. 14 is a functional block diagram of wireless power circuitry 1400 in accordance with a dual mode receiver configuration with a first coil 1419a and second coil 1418b, in accordance with exemplary implementations. The first coil 1418a is coupled to a first receive circuit 1460. The first coil 1418a may correspond to any of the first coils of FIGS. 7-13. The first receive circuit 1460 includes a filter 1462 and power conversion circuitry and control circuitry 1464. The power conversion circuitry and control circuitry 1464 may include multiple components configured to convert AC/DC for power that may be coupled to a device to be charged 1470 (e.g., a portable electronic device). Furthermore the block 1464 may have a controller or other circuitry that is configured to manage power wirelessly received to be compliant according to a set of operating characteristics associated with receiving power in compliance with a first transmitter 404.

The second coil 1418b is coupled to a second receive circuit 1450. The second coil 1418b may correspond to any of the second coils of FIGS. 7-13. The second receive circuit 1450 includes a filter 1452 a rectifier 1454 and a DC/DC converter 1456 configured to convert the output of the rectifier to a level to be received at a charge port of the device to be charged 1470. Other components may be included for converting power received via the second coil 1418a according to a set of operating characteristics in compliance with power transmitted by a second transmitter 404 (e.g., another filter circuit (not shown) positioned at the output of the rectifier may additionally be included in the second receive circuit 1450 that may at least in part reduce losses in efficiency of the second coil 1418b caused by the first coil 1418a).

Both receive circuits are coupled to a charge port of a device to be charged 1470. In some implementations each receive circuit 1450 and 1460 may be selectively coupled to the charge port (e.g., via switches) while in other implementations both circuits 1450 and 1460 are coupled to the charge port. The device to be charged 1470 may include power management circuitry 1472 for managing power received via the charge port from wireless power receiver circuitry and the device to be charged 1470 may further include a battery 1474 for charging and a controller 1476 (e.g., any combination of controllers that may include applications, processors, modems, and the like). In some implementations the device to be charged 1470 may be configured to send control parameters (not shown) to the receive circuits 1450 and 1460 to control various operations of the receive circuits 1450 and 1460. Also not shown are different communication circuits that may be configured to communicate with the first or second transmitter types to control power transfer in some aspects as described above.

In some cases it is advantageous to reduce losses that may arise from, for example, parasitic elements in the circuits connected to the resonator. For example it is advantageous to reduce losses arising from the first coil 1418a when power is being transferred at a second frequency that is intended to be received by the second coil 1418b (e.g., prevent the first coil 1418b from absorbing significant power transmitted at the second frequency). In accordance with an implementation, the second receive circuit 1450 includes a detection circuit 1458 configured to detect that power is being received at the second frequency associated with the second coil 1418b. If the detection circuit 1458 detects power being received at the second frequency associated with the second coil 1418b then a characteristic of the first receive circuit 1460 is altered that reduces an amount of power absorbed by the first coil 1418a via the second alternating magnetic field at the second frequency. Altering the characteristic of the first receive circuit 1460 may include any one of a number of different alterations such as disabling the filter circuit 1462 or altering an electrical characteristic of one or more components electrically connected to the first coil 1418a such as selectively electrically disconnecting the first coil 1418b from the first receive circuit 1460 via one or more switches positioned at one or more locations within the first receive circuit 1460. It should be appreciated that the reverse may be true where there may be a detection circuit configured to detect power received at the first frequency where a characteristic of the second receive circuit 1450 coupled to the second coil 1418b is altered to reduce power absorbed by the second coil 1418b when power is being transmitted at the first frequency associated with the first coil 1418a.

In some cases it may be further beneficial to add circuitry to one or both of the first or second receive circuits 1450 and 1460 to reduce losses arising from the first coil 1418a or first receive circuit 1460 when power is being transferred at a second frequency that is intended to be received by the second coil 1418b (and vice versa). For example switches in the first receive circuit 1460 may create a lossy shunt path that draws power at the operating frequency of the second coil 1418b. Furthermore there may be losses due to other parasitics in the first receive circuit 1460. As such, in an implementation the switch configuration or types of switching components used by the first receive circuit 1450 may be altered to prevent lossy paths at the second coil operating frequency (and vice versa relative to the second receive circuit 1460).

In another implementation, a filter circuit may be added to the first receive circuit 1460 that blocks energy at the operating frequency of the second coil 1418b (and vice versa where a filter circuit may be added to the second receive circuit 1450 that is configured to block energy at the operating frequency of the first coil 1418a).

Figure 15A:
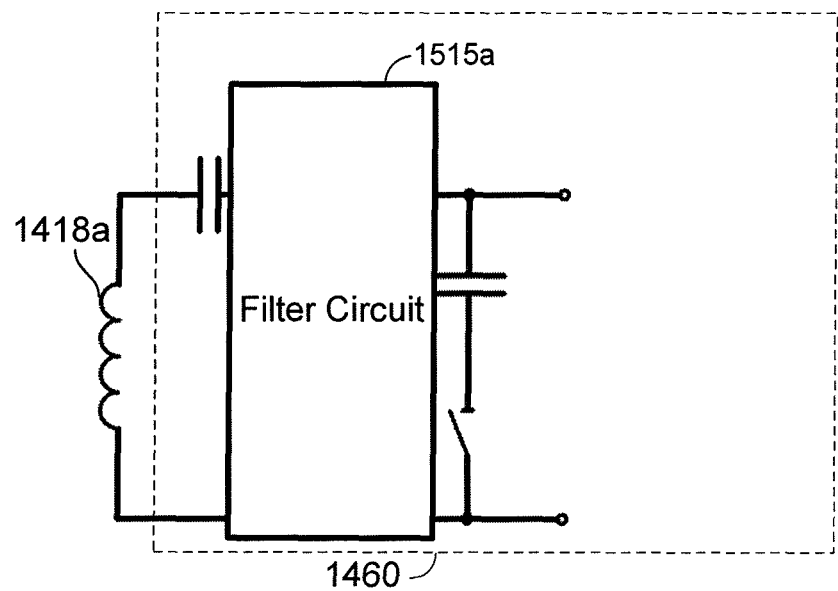
FIG. 15A is a schematic diagram of a filter circuit configured to block energy at an operating frequency associated with a second coil, in accordance with an implementation.

FIG. 15A is a schematic diagram of a filter circuit 1510 configured to block energy at an operating frequency associated with a second coil 1418b, in accordance with an implementation. The filter circuit 1510a is positioned within a receive circuit 1460 electrically connected to a first coil 1418a. The filter circuit 1510 may be electrically connected in series with a tuning component of the first receive circuit 1460 (e.g., a capacitor). The filter circuit 1510a may be positioned to prevent energy at an operating frequency from passing through one or more components that have losses at the operating frequency of the second coil 1418b. The filter circuit 1510a is configured to block energy at the operating frequency associated the second coil 1418b to reduce losses when power is being transferred via the second coil 1418b. Note while FIG. 15A shows one example of portion of a topology of circuitry connected to the first coil 1418a, any other topology of tuning components or other circuitry connected to the first coil 1418a is contemplated herein.

Figure 15B:
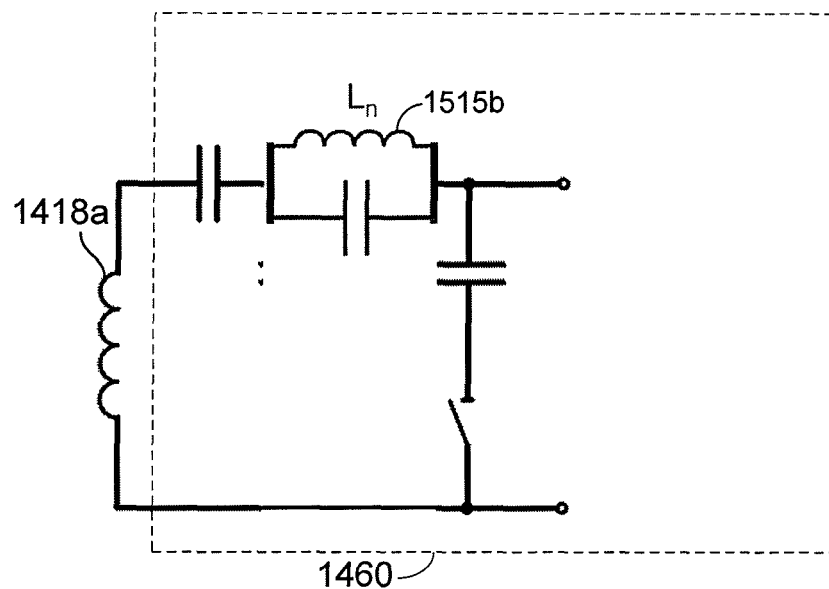
FIG. 15B is a schematic diagram of an implementation of the filter circuit of FIG. 10A, in accordance with an implementation.

FIG. 15B is a schematic diagram of an implementation of the filter circuit 1510b of FIG. 15A, in accordance with an implementation. FIG. 15B includes a band-stop filter circuit 1510b that is electrically connected in series with a tuning capacitor of the first receive circuit 1460. The band-stop circuit 1510b is configured to be resonant at the operating frequency associated with the second coil 1418b and configured to block energy at the operating frequency associated with the second coil 1418b to reduce losses when power is being transferred via the second coil 1418b. It should be appreciated that while FIGS. 15A and 15B show the filter circuit 1510a/1010b in the first receive circuit 1460, the filter circuit 1510a/1010b could likewise be positioned in the second receive circuit 950 and be configured to block energy at the operating frequency of the first coil 1418a to reduce losses in the second receive circuit 950 due to transferring power via the first coil 1418b.

Figure 16:
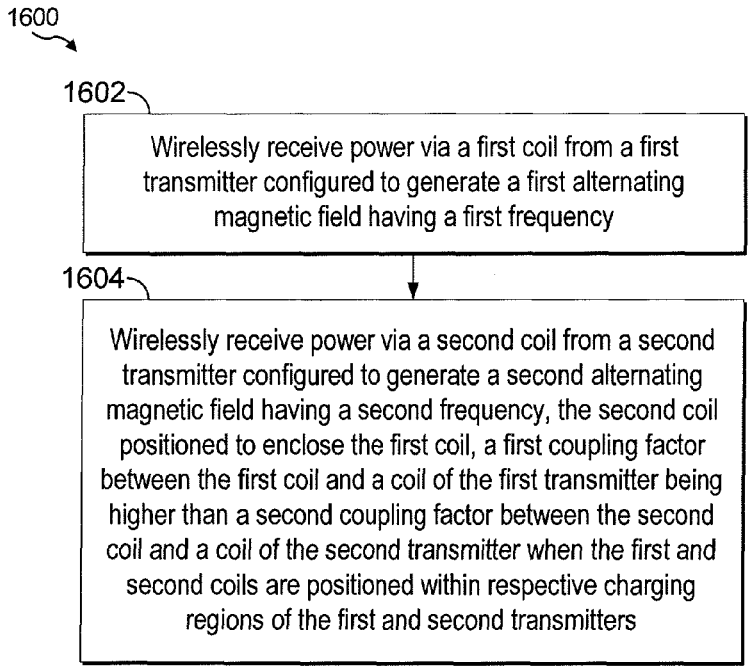
FIG. 16 is a flow chart of an exemplary method for receiving wireless power, in accordance with an exemplary implementation of the invention.

FIG. 16 is a flow chart of an exemplary method 1600 for receiving wireless power, in accordance with an exemplary implementation. The method may be carried out by any of the receivers as previously described in connection with any of FIGS. 1-3, 5, and 7-14. Although blocks may be described as occurring in a certain order, the blocks can be reordered, blocks can be omitted, and/or additional blocks can be added.

The method may begin at block 1602, which includes wirelessly receiving power via a first coil from a first transmitter configured to generate a first alternating magnetic field having a first frequency. The method may proceed to block 1604, which includes wirelessly receiving power via a second coil from a second transmitter configured to generate a second alternating magnetic field having a second frequency higher than the first frequency. The second coil is positioned to enclose the first coil. A first coupling factor between the first coil and a coil of the first transmitter is higher than a second coupling factor between the second coil and a coil of the second transmitter when the first and second coils are positioned within respective charging regions of the first and second transmitters.

Figure 17:
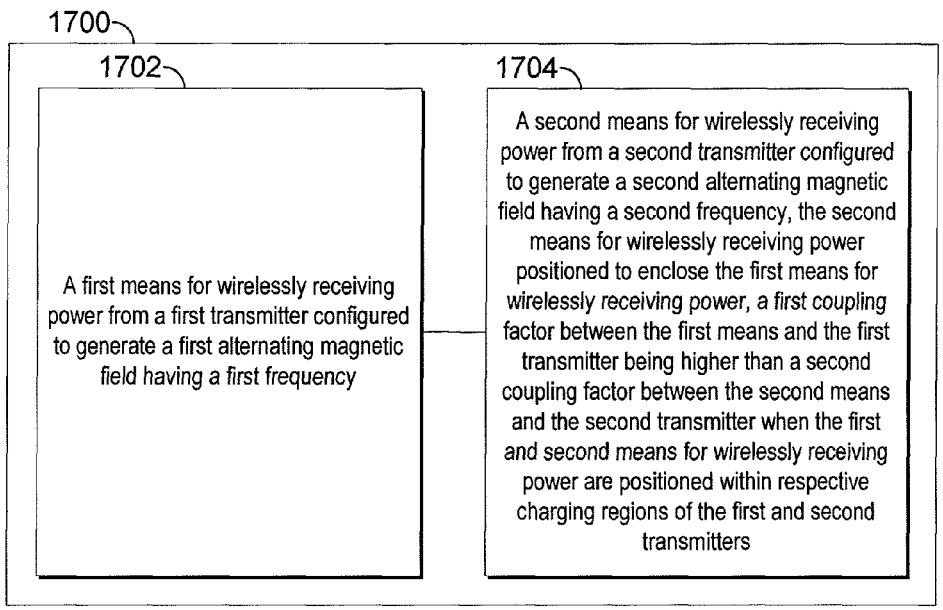
FIG. 17 is a functional block diagram of an apparatus for receiving wireless power, in accordance with an exemplary implementation of the invention.

FIG. 17 is a functional block diagram of an apparatus 1700 for receiving wireless power, in accordance with an exemplary implementation of the invention. The apparatus comprises first means 1702 for wirelessly receiving power from a first transmitter configured to generate a first alternating magnetic field having a first frequency. The apparatus further comprises second means 1704 for wirelessly receiving power from a second transmitter configured to generate a second alternating magnetic field having a second frequency higher than the first frequency. The second means for wirelessly receiving power is positioned to enclose the first means for wirelessly receiving power. A first coupling factor between the first means and the first transmitter is higher than a second coupling factor between the second means and the second transmitter when the first and second means for wirelessly receiving power are positioned within respective charging regions of the first and second transmitters.

It should be appreciated that the principles and aspects described herein may additionally apply to a dual mode transmitter that is configured to transmit power differently (and for example have different coils) for different receiver types. For example, a transmitter may support a higher wireless power operating frequency (e.g., perhaps associated with loosely coupled wirelessly power transfer as described above) and a lower wireless power operating frequency (e.g., perhaps associated with tightly coupled wireless power transfer). In one implementation, the transmitter may have different coils for different modes associated with different wireless power operating characteristics and frequencies. According to another implementation a transmitter may have two charging areas to support each mode. In another implementation, a transmitter may have one charging area and one resonator (e.g., coil and other circuitry) driven by two driving circuits. The current levels for the resonator and frequency may be adjusted by the different driving circuits for different modes. In some aspects a cored transformer may be used to achieve various "drive-into" impedances.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, a first means for wirelessly receiving power may comprise a first coil and a second means for wirelessly receiving power may comprise a second coil. In addition a means for detecting may comprise a detection circuit.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for receiving wireless power, the apparatus comprising:
   a first coil configured to wirelessly receive power from a first transmitter configured to generate a first alternating magnetic field having a first frequency;
   a second coil configured to wirelessly receive power from a second transmitter configured to generate a second alternating magnetic field having a second frequency higher than the first frequency, the second coil positioned to enclose the first coil;
   a receive circuit electrically connected to the first coil;
   a filter circuit electrically connected to the receive circuit and configured to reduce energy received by the first coil at the second frequency; and
   a detection circuit electrically connected to the first coil and configured to:
      detect power being received at the second frequency, and upon detection of power received at the second frequency, reduce an amount of power received by the first coil via the second alternating magnetic field at the second frequency by altering a characteristic of circuitry including the first coil.

2. The apparatus of claim 1, wherein a first coupling factor between the first coil and a coil of the first transmitter is higher than a second coupling factor between the second coil and a coil of the second transmitter when the first and second coils are positioned within respective charging regions of the first and second transmitters.

3. The apparatus of claim 1, wherein the detection circuit is electrically connected to the second coil.

4. The apparatus of claim 1, wherein the detection circuit is further configured to:
   detect power being received at the first frequency, and upon detection of power received at the first frequency, reduce an amount of power received by the second coil via the first alternating magnetic field at the first frequency by altering a characteristic of circuitry including the second coil in response to detecting the power received at the first frequency.

5. The apparatus of claim 1, wherein the first and second coils share at least a portion of a conductive structure.

6. The apparatus of claim 1, wherein the first coil is configured to wirelessly receive power as defined by a first set of wireless power requirements and wherein the second coil is configured to wirelessly receive power as defined by a second, different, set of wireless power requirements.

7. The apparatus of claim 1, further comprising a magnetic material positioned between circuitry of the apparatus and the first and second coils.

8. The apparatus of claim 7, wherein the magnetic material further comprises a first portion under the first coil physically separated from a second portion under the second coil by a gap extending along an entire perimeter of the first portion, the gap attenuating an amount of magnetic flux flowing from the first portion to the second portion.

9. The apparatus of claim 7, wherein the magnetic material further defines a gap disposed between the first coil and the second coil and extending along at least one side of the first coil, the gap attenuating an amount of magnetic flux flowing between the first coil and the second coil in the magnetic material.

10. The apparatus of claim 7, wherein the magnetic material further comprises:
   a first portion of the magnetic material under the first coil,
   a second portion of the magnetic material under the second coil, and
   at least one ring of magnetic material having a different magnetic permeability than at least one of the first and second portions, the at least one ring of magnetic material attenuating an amount of magnetic flux flowing between the first and the second portions.

11. The apparatus of claim 1, further comprising a second receive circuit including the second coil, the second receive circuit configured to substantially resonate at the second frequency.

12. The apparatus of claim 1, wherein the first and second coils are positioned to have a distance between an outermost turn of the first coil and an innermost turn of the second coil sufficient to attenuate losses due to parasitic coupling between the first and second coils.

13. The apparatus of claim 1, wherein the detection circuit is configured to detect the first or second transmitter, the detection circuit configured to selectively couple the first or second coil to a load based on detecting the first or second transmitter.

14. A method of receiving wireless power, the method comprising:
wirelessly receiving power via a first coil from a first transmitter configured to generate a first alternating magnetic field having a first frequency;
wirelessly receiving power via a second coil from a second transmitter configured to generate a second alternating magnetic field having a second frequency higher than the first frequency, the second coil positioned to enclose the first coil;
reducing energy received by the first coil at the second frequency utilizing a filter circuit electrically connected to a receive circuit that is electrically connected to the first coil;
detecting power being received at the second frequency, and
reducing an amount of power received by the first coil via the second alternating magnetic field at the second frequency by altering a characteristic of circuitry including the first coil in response to detecting the power received at the second frequency.

15. The method of claim 14, wherein a first coupling factor between the first coil and a coil of the first transmitter is higher than a second coupling factor between the second coil and a coil of the second transmitter when the first and second coils are positioned within respective charging regions of the first and second transmitters.

16. The method of claim 14, further comprising:
detecting power being received at the first frequency, and
reducing an amount of power received by the second coil via the first alternating magnetic field at the first frequency by altering a characteristic of circuitry including the second coil in response to detecting the power received at the first frequency.

17. The method of claim 14, further comprising:
wirelessly receiving power as defined by a first set of wireless power requirements utilizing the first coil, and
wirelessly receiving power as defined by a second, different, set of wireless power requirements utilizing the second coil.

18. The method of claim 14, further comprising attenuating an amount of magnetic flux flowing between a first portion of a magnetic material under the first coil and a second portion of the magnetic material under the second coil utilizing a gap defined in the magnetic material and extending along an entire perimeter of the first portion.

19. The method of claim 14, further comprising attenuating an amount of magnetic flux flowing between the first coil and the second coil in a magnetic material utilizing a gap in the magnetic material defined between the first coil and the second coil and extending along at least one side of the first coil.

20. The method of claim 14, further comprising attenuating an amount of magnetic flux flowing between a first portion of a magnetic material under the first coil and a second portion of the magnetic material under the second coil utilizing at least one ring of magnetic material disposed in a plane of the first and second portions and having a different magnetic permeability than at least one of the first and second portions.

21. A non-transitory computer-readable medium comprising code that, when executed, causes an apparatus to:
wirelessly receive power via a first coil from a first transmitter configured to generate a first alternating magnetic field having a first frequency;
wirelessly receive power via a second coil from a second transmitter configured to generate a second alternating magnetic field having a second frequency higher than the first frequency, the second coil positioned to enclose the first coil;
reduce energy received by the first coil at the second frequency utilizing a filter circuit electrically connected to a receive circuit that is electrically connected to the first coil;
detect power being received at the second frequency, and
reduce an amount of power received by the first coil via the second alternating magnetic field at the second frequency by altering a characteristic of circuitry including the first coil in response to detecting the power received at the second frequency.

22. The medium of claim 21, wherein a first coupling factor between the first coil and a coil of the first transmitter is higher than a second coupling factor between the second coil and a coil of the second transmitter when the first and second coils are positioned within respective charging regions of the first and second transmitters.

23. The medium of claim 21, wherein the code, when executed, further causes the apparatus to:
detect power being received at the first frequency, and
reduce an amount of power received by the second coil via the first alternating magnetic field at the first frequency by altering a characteristic of circuitry including the second coil in response to detecting the power received at the first frequency.

24. The medium of claim 21, wherein the code, when executed, further causes the apparatus to:
wirelessly receive power as defined by a first set of wireless power requirements utilizing the first coil, and
wirelessly receive power as defined by a second, different, set of wireless power requirements utilizing the second coil.

25. An apparatus for receiving wireless power, the apparatus comprising:
first means for wirelessly receiving power from a first transmitter configured to generate a first alternating magnetic field having a first frequency; and
second means for wirelessly receiving power from a second transmitter configured to generate a second alternating magnetic field having a second frequency higher than the first frequency, the second means for wirelessly receiving power positioned to enclose the first means for wirelessly receiving power;
means for blocking energy at the second frequency received by the first means for wirelessly receiving power;

means for detecting power being received at the second frequency; and means for reducing an amount of power received via the second alternating magnetic field at the second frequency by the first means for wirelessly receiving power by altering a characteristic of circuitry including the first means for wirelessly receiving power in response to detecting the power received at the second frequency.

26. The apparatus of claim 25, wherein a first coupling factor between the first means and the first transmitter is higher than a second coupling factor between the second means and the second transmitter when the first and second means for wirelessly receiving power are positioned within respective charging regions of the first and second transmitters.

27. The apparatus of claim 25, further comprising:

means for detecting power being received at the first frequency; and means for reducing an amount of power received via the first alternating magnetic field at the first frequency by the second means for wirelessly receiving power by altering a characteristic of circuitry including the second means for wirelessly receiving power in response to detecting the power received at the first frequency.

28. An apparatus for receiving wireless power, the apparatus comprising:

a first coil configured to wirelessly receive power from a first transmitter configured to generate a first alternating magnetic field having a first frequency;

a second coil configured to wirelessly receive power from a second transmitter configured to generate a second alternating magnetic field having a second frequency higher than the first frequency, the second coil positioned to enclose the first coil;

a receive circuit electrically connected to the first coil;

a filter circuit electrically connected to the receive circuit and configured to reduce energy received by the first coil at the second frequency; and a detection circuit electrically connected to the second coil and configured to:

detect power being received at the first frequency, and upon detection of power received at the first frequency, reduce an amount of power received by the second coil via the second alternating magnetic field at the first frequency by altering a characteristic of circuitry including the second coil.

29. The apparatus of claim 28, wherein the detection circuit is electrically connected to the first coil.

30. The apparatus of claim 28, wherein the first coil is configured to wirelessly receive power as defined by a first set of wireless power requirements and wherein the second coil is configured to wirelessly receive power as defined by a second, different, set of wireless power requirements.

* * * * *